United States Patent [19]

Hieda

[11] Patent Number: 4,757,385
[45] Date of Patent: Jul. 12, 1988

[54] VIDEO SIGNAL PROCESSING APPARATUS WITH MEANS FOR CORRECTING INTERLACE DISPLACEMENT

[75] Inventor: Teruo Hieda, Kanagawa, Japan

[73] Assignee: Canon Kabushiki Kaisha, Tokyo, Japan

[21] Appl. No.: 839,057

[22] Filed: Mar. 13, 1986

[30] Foreign Application Priority Data

Mar. 16, 1985 [JP] Japan .................................. 60-053029
Apr. 16, 1985 [JP] Japan .................................. 60-081090
Apr. 16, 1985 [JP] Japan .................................. 60-081091

[51] Int. Cl.⁴ .............................................. H04N 3/14
[52] U.S. Cl. ........................... 358/213.22; 358/213.27
[58] Field of Search ................... 358/212, 41, 48, 162, 358/213.22, 213.27, 213.29

[56] References Cited

U.S. PATENT DOCUMENTS

4,475,125 10/1984 Esser et al. ........................... 358/213
4,507,684 3/1985 Battson ................................ 358/213
4,514,765 4/1985 Miyata et al. ........................ 358/213
4,571,625 2/1986 Boudewijns ......................... 358/213

Primary Examiner—Jin F. Ng
Assistant Examiner—Stephen Brinich
Attorney, Agent, or Firm—Toren, McGeady & Associates

[57] ABSTRACT

A video signal processing apparatus comprises a driving circuit arranged to drive an image sensor in an interlacing manner; a delay device for delaying an output signal of the image sensor; a processing circuit which is provided for at least one of the odd-number field and even-number field portions of the output signal of the image sensor and is arranged to correlatively process the signal delayed by the delay device and the signal delayed by via the delay device; and a contour signal forming circuit arranged to perform contour correction on the video signal by using a delayed signal of the delay device. The signal processing apparatus is capable of correcting a disorder in the barycenter of sensitivity as well as profile correction with simple arrangement.

12 Claims, 6 Drawing Sheets

VIDEO SIGNAL PROCESSING APPARATUS WITH MEANS FOR CORRECTING INTERLACE DISPLACEMENT

BACKGROUND OF THE INVENTION

1. Field of the Invention

This invention relates to a video signal processing apparatus for processing a video signal produced from an image sensor, such as a solid-state image sensor, and, more particularly, to means for obtaining an accurate video signal by correcting the signal produced from the image sensor and for accomplishing contour correction with a simple arrangement.

2. Description of the Prior Art

In the television camera of the kind using a solid-state image sensor MOS, CCD, etc., the image sensor is composed of picture elements formed with cells which have a photo-electric effect and are two-dimensionally arranged on the surface of a monolithic semiconductor obtained by manufacturing technique for a highly integrated IC such as LSI, VLSI, etc. The solid-state image sensor produces, in a time serial manner, the photo-electric conversion outputs of these picture elements. A television signal is obtained from the output of the sensor.

For the TV camera of this kind, there have been proposed many image sensing methods (such as spatial picture element shifting method) and signal processing methods of correcting the output of the solid-state image sensor for the purpose of simplifying the structural arrangement of the solid-state image sensor. Further, in the case of a color TV camera, chrominance signals are taken out with a color separation filter arranged on the surface of the solid-state image sensor. Many methods also have been proposed for the arrangement of the image sensor and for processing the chrominance signal obtained in that instance.

Further, it has been practiced to obtain a contour signal by combining an original signal with a signal obtained by delaying the original signal for the purpose of correcting the contour of a video signal.

The solid-state image sensor performs a photoelectric converting operation on the quantity of light of the image of an object incident on the cells and analogically accumulates it. The cells somewhat differ from each other in the dark current produced from each of them due to unevenness in their output characteristics and imperfectness of crystals arising during the manufacture of them. This causes dark current irregularity. This irregularity must be minimized. If not, the output video signal would be affected thereby. This presents no problem for a device of the kind handing a digital signal as such a slight level error is erased during a binary coding process. However, as compared with an LSI or the like arranged to handle a digital signal, a solid-state image sensor handling a video signal must be arranged to minimize the unevenness of the outputs of cells and flaws of their crystals. Besides, there is a manufacturing difficulty in arranging many picture elements.

In order to improve the horizontal resolution and the vertical resolution among the basic performances of a TV camera, and to suppress a false signal from being generated, it is desirable to have picture elements arranged in a large number. This requirement then furthers the manufacturing difficulty.

Meanwhile, the vertical resolution can be doubled by performing an interlacing driving operation on the image sensor such as a solid-state image sensor. However, accurate interlacing is difficult due to inconsistency of the characteristics of solid-state image sensors and the use of a color separation filter.

Further, the conventional profile correcting arrangement necessitates use of one or a plurality of delay lines each of which is arranged to delay video signals for one horizontal line period. However, these delay lines are expensive because of their complex arrangement. The use of them, therefore, inevitably results in an increased cost of the whole apparatus.

SUMMARY OF THE INVENTION

It is an object of this invention to provide a video signal processing apparatus wherein an interlacing driving operation can be accurately performed on an image sensor for improved vertical resolution, without increasing the number of picture elements of the image sensor, despite uneven or inconsistent characteristics of the picture elements and, in the event of use of a color separation filter, despite any positional deviation thereof; and a contour correcting operation can be accomplished on a video signal by a simple arrangement used in combination with the means for performing the accurate interlacing driving operation.

It is another object of this invention to provide a video signal processing apparatus which solves the above-stated problems of the prior art and is capable of giving an accurate video signal despite the inconsistent characteristics of the picture elements, etc., of an image sensor.

It is a further object of this invention to provide a video signal processing apparatus which is capable of accurately performing an interlacing driving operation on an image sensor for improvement in the vertical resolution characteristic, without increasing the number of picture elements of the image sensor, despite uneven characteristics of the picture elements and, in the event of use of a color separation filter, despite any positional deviation thereof.

It is a still further object of this invention to provide a video signal processing apparatus which, in obtaining a required vertical resolution characteristic, permits use of a solid-state image sensor obtainable without any severe restriction imposed on the uniformity of characteristics among picture elements and on the number of picture elements arranged in the vertical direction.

To attain the objects described above, a video signal processing apparatus, arranged according to this invention as an embodiment, thereof comprises: interlaced driving means for interlacedly driving an image sensor; delaying means for delaying at least one of the odd-number field and even-number field portions of the output signal of the image sensor; and processing means for correlatively processing the signal coming via the delaying means and the signal not coming via the delaying means, in such a way as to correct the disorder of the barycenters of sensitivity which results from the interlaced driving operation.

With a signal obtained by the interlaced driving operation on the image sensor, unevenness in characteristic, etc., among the picture elements of the image sensor brings about some discrepancy in the barycenter of sensitivity between the odd-number field portion and the even-number field portion of the signal thus obtained. In accordance with the arrangement of the embodiment described, however, the disorder of the barycenter of sensitivity can be corrected by delaying at least one of the odd-number and even-numbered field portions of the signal with the delaying means and by correlatively processing a signal obtained via this delaying means and a signal not obtained via the delaying means.

To attain these objects, a video signal processing apparatus, arranged according to this invention as another embodiment thereof, comprises: means for interlacedly driving an image sensor; delaying means for delaying the output signal of the image sensor; processing means for correlatively processing, for at least one of the odd-number and even-number portions of the output signal of the image sensor, the signal coming via the delaying means and the signal not coming via the delaying means in such a way as to correct the disorder of the barycenter of sensitivity which results from the interlaced driving operation; and contour signal forming means for forming, with the output signal of the delaying means, a signal to be used for correcting the contour of the video signal.

With a signal obtained by the interlaced driving operation on the image sensor, unevenness or inconsistency in characteristic, etc., among the picture elements of the image sensor brings about some discrepancy in the barycenter of sensitivity between the odd-number field portion and the even-number field portion of the signal thus obtained. However, in accordance with the arrangement of the embodiment described above, the disorder of the barycenter of sensitivity can be corrected by delaying at least one of the odd-number and even-number field portions of the signal with the delaying means, and by correlatively processing a signal obtained via this delaying means and a signal not obtained via the delaying means. In addition to that, a signal for correcting the contour of the video signal can be formed by also using the delaying means.

Further, to attain the objects of this invention, a video signal processing apparatus, arranged as a further embodiment thereof, comprises: means for interlacedly driving an image sensor; delaying means for delaying the output signal of the image sensor; contour signal forming means for forming a contour signal by using the delaying means; and processing means for correlatively processing, for at least one of the odd-number and even-number field portions of the output signal of the image sensor, the signal coming via the contour signal forming means and the signal not coming via the contour signal forming means in such a way as to correct the disorder of the barycenter of sensitivity which results from the interlaced driving operation.

In accordance with the arrangement of this embodiment, the contour signal is formed by the contour signal forming means; and, for at least one of the odd-number and even-number portions of the signal from the image sensor, the processing means correlatively processes the signal coming via the contour signal forming means and the signal not coming via the contour signal forming means in such a manner that the disorder of the barycenter of sensitivity which is obtained by the interlaced driving operation performed on the image sensor is corrected. Therefore, any discrepancy in the barycenter of sensitivity that arises between the odd-number and even-number portions of the signal obtained by the interlaced driving operation on the image sensor due to unevenness in characteristic, etc., among the picture elements of the image sensor can be eliminated to a substantial extent.

The foregoing and other objects and features of the invention will be apparent from the following detailed description of preferred embodiments thereof taken in conjunction with the accompanying drawings.

DETAILED DESCRIPTION OF THE PREFERRED EMBODIMENTS

In the following description of preferred embodiments of this invention given with reference to the accompanying drawings, a solid-state image sensor is employed as an image sensor. The description includes the image sensing apparatus to which this invention is applicable; the principle of the interlacing correction of this invention; the outlines of video signal processing apparatuses arranged as the embodiments of this invention; and details of modifications of the embodiments.

Figure 1:
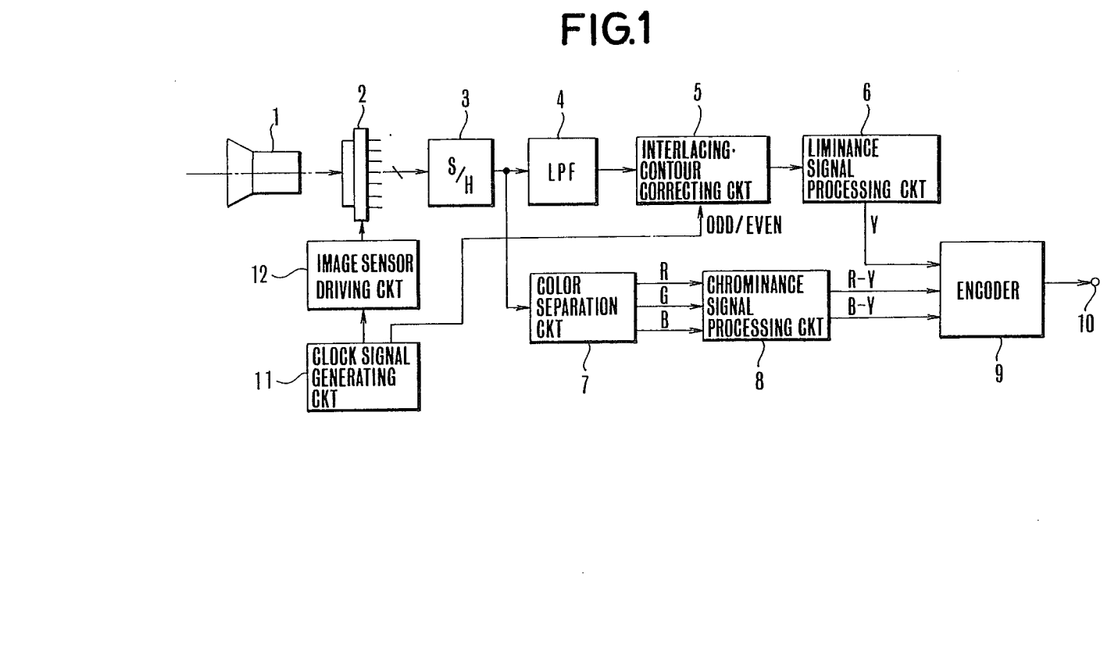
FIG. 1 is a block diagram showing, by way of example, an image sensing apparatus to which a video signal processing arrangement according to this invention is applicable.

The Image Sensing Apparatus to which this Invention is applicable (FIG. 1):

FIG. 1 shows the whole arrangement of an image sensing apparatus to which this invention is applicable. The illustration includes a photo-taking optical system; a solid-state image sensor which is a frame transfer CCD in this case; a sample-and-hold circuit 3 which samples and holds the signal produced from the solid-state image sensor; a low-pass filter (LPF) 4; and an interlacing correcting and contour correcting circuit 5 (hereinafter referred to as a correction circuit for short). For a luminance signal Y, the correction circuit 5 processes either both the odd-number field and even-number field portions of the signal or one of the field portions of the signal in a manner as will be further described later. This circuit 5 performs interlacing correction to have the barycenters of sensitivity of the signals of scanning lines obtained substantially at even intervals. Further, for the interlacing correction, delay means is arranged to delay the incoming luminance signal. Then, by utilizing the output signal of the delay means, a signal is formed for correcting the contour of the video signal. Thus, both the interlacing correction and the contour correction are accomplished on the video signal. A luminance signal processing circuit 6 is arranged to perform a necessary operation, such as gamma correction, etc., on the signal produced from the correction circuit 5.

A color separation circuit 7 is arranged, for example, to divide the output of the sample-and-hold circuit 3 into three components R, G and B. The chrominance signals thus obtained are subjected to a necessary processing operation at a chrominance signal processing circuit 8, such as gamma correction, etc. The circuit 8 further forms color difference signals R−Y and B−Y from these chrominance signals and also performs a modulation process as required. An encoder 9 is arranged to combine the luminance signal Y, produced from the luminance processing circuit 6, and the color difference signals R−Y and B−Y, produced from the chrominance signal processing circuit 8, into a standard TV signal, such as an NTSC signal. The TV signal thus obtained is supplied from an output terminal 10 to an applicable external apparatus.

A clock signal generating circuit 11 is arranged to generate a clock signal for synchronizing control over an image sensor driving circuit 12 and other signal processing circuits. In addition to that, the circuit 11 supplies the correction circuit 5 with an odd-number field/even-number field switching signal. The image sensor driving circuit 12 is arranged to supply a transfer clock signal to each of the electrodes of the solid-state image sensor 2 and to transfer and read out a signal electric charge accumulated at each of the picture elements.

With the apparatus arranged as described above, an image of an object to be photographed is projected via the photo-taking optical system 1 upon the light receiving part of the solid-state image sensor 2. Then, each of the cells of the light receiving part accumulates a signal electric charge corresponding to the light quantity of the object image incident thereon. Under the control of the transfer clock signal from the image sensor driving circuit 12, the signal electric charge is read out from the image sensor 2 in the form of a time serial signal for every odd-number field and every even-number field. This signal is supplied to the sample-and-hold circuit 3. At the sample-and-hold circuit 3, the time serial signal is made to be continuous at every sampling period. The output of the circuit 3 is supplied to the low-pass filter 4 to have a luminance signal component Y taken out, on the one hand, and the output of the low-pass filter 4 is subjected to the interlacing and contour correction performed at the correction circuit 5. The output of the correction circuit 5 is processed, as mentioned above, at the luminance signal processing circuit 6 and is then supplied to the encoder 9. The output of the sample-and-hold circuit 3, on the other hand, is supplied to the color separation circuit 7 to have the chrominance signals R, G and B, for example, separated therefrom. These outputs of the color separation circuit 7 are supplied to the chrominance signal processing circuit 8. The circuit 8 then forms the color difference signals R−Y and B−Y and performs other processes as required. These color difference signals are supplied to the encoder 9. The encoder forms 9 the above-stated standard TV signal from the luminance signal and the color difference signals. The TV signal is supplied from the output terminal 10 to an applicable external apparatus.

Figure 2:
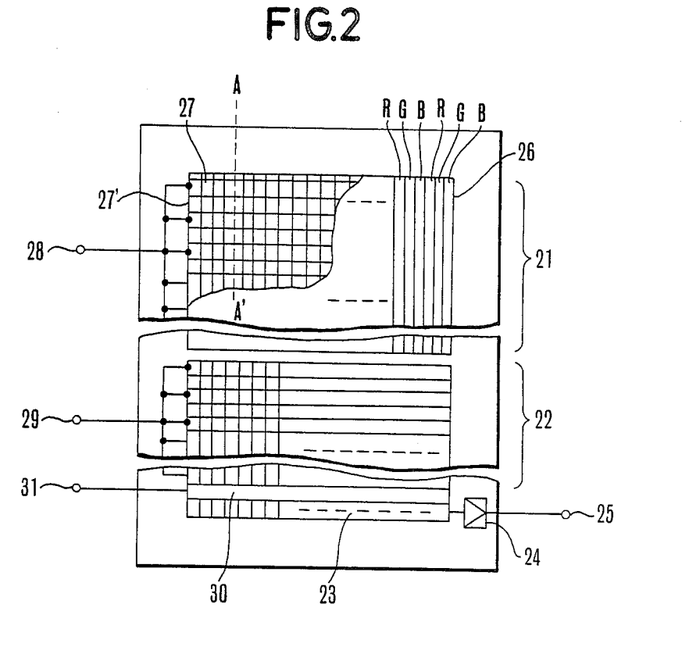
FIG. 2 is an illustration showing the arrangement of a frame transfer CCD employed as an image sensor.

Principle of Interlacing Correction of the Invention (FIGS. 2 to 6):

The principle of interlacing correction of this invention is as described, by way of example, in the following with reference to FIGS. 2 to 6: FIG. 2 schematically shows the inner arrangement of the frame transfer CCD which is employed as the solid-state image sensor 2 as shown in FIG. 1. Referring to FIG. 2, a light receiving part 21 is arranged to accumulate a signal charge corresponding to the quantity of light of each point of an object image projected on the light receiving part 21. A storing part 22 is arranged to receive from the light receiving part 21, the signal electric charge accumulated for every odd-number field and every even-number field. The illustration includes a horizontal transfer register 23; a buffer amplifier 24; an output terminal 25 which is connected to the sample-and-hold circuit 3 of FIG. 1; color separating filters 26 which are arranged on the surface of the light receiving part 21 in the order of, for example, colors R, G, B, R, G,—and are shown in a partly cut-out state in the drawing; a transfer electrode 27; a virtual electrode part 27'; a light receiving part transfer clock terminal 28; a storing part transfer clock terminal 29; a transfer gate 30; and a transfer gate terminal 31.

With the frame transfer CCD arranged as described above, the image of an object coming through the photo-taking optical system 1 is divided into the three color components R, G and B by means of the color separating filters 26. Then a signal electric charge, corresponding to the quantity of light of each color of the object image, is accumulated at each of the picture elements of the light receiving part 21. After the electric charge is accumulated for a one-field period at the light receiving part 21, the electric charge is transferred to the storing part 22 in the vertical direction according to a clock signal received at the light receiving part transfer clock terminal 28. At the storing part 22, the electric charge is transferred via the transfer gate 30 to the horizontal transfer register 23 once for every line according to a clock signal applied to the storing part transfer clock terminal 29 and another clock signal supplied to the transfer gate terminal 31 in synchronism with the clock signal applied to the terminal 29. The one-line portion of the signal electric charge which has been horizontally transferred by the horizontal transfer register 23 is converted into a voltage by the buffer amplifier 24. The voltage thus obtained is produced from the output terminal 25 in the form of a time serial signal to be supplied to the sample-and-hold circuit 3 of FIG. 1.

Figure 3:
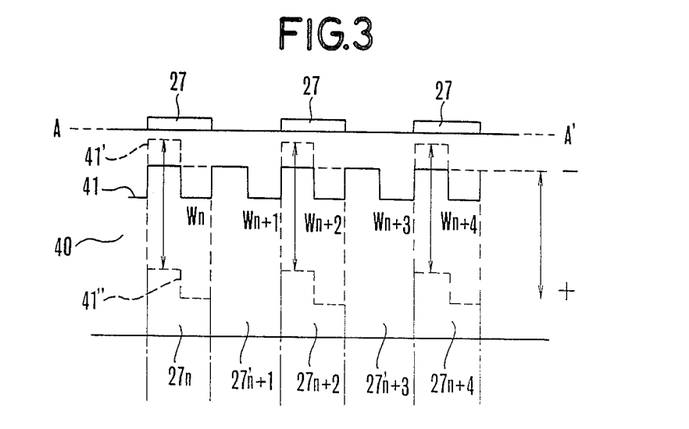
FIG. 3 is a sectional view taken along line A-A' of FIG. 2.

FIG. 3 is a sectional view taken along a line A-A' shown in FIG. 2. This sectional illustration includes a semiconductor substrate 40 of P-type silicon or the like; transfer electrodes 27 which are transparent and are composed of a conductive poly-silicon film; transfer electrode parts $27_n$, $27_{n+2}$, $27_{n+4}$,—are arranged right below the transfer electrodes 27; and virtual electrode parts (virtual phase) $27'_{n+1}$, $27'_{n+3}$,—. In FIG. 3, for the sake of simplification of the illustration, these transfer electrode parts $27_n$, etc., and these virtual electrode parts $27'_{n+1}$, etc., are shown having the same width. A reference numeral 41 denotes the potential distribution obtained during the process of electric charge accumulation within the semiconductor substrate 40. Reference symbols $W_n$, $w_{n+2}$,—, denote potential wells formed at the transfer electrode parts; and $w_{n+1}$, $W_{n+3}$,—, potential wells at the virtual electrode parts, respectively.

Figure 4:
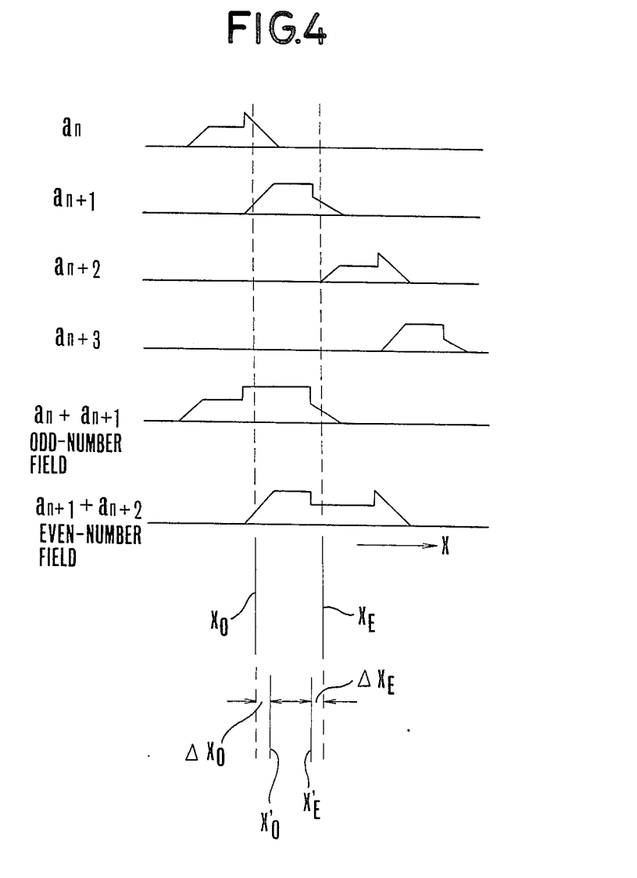
FIG. 4 is an illustration of a sensitivity distribution obtained by adding up electric charges accumulated at potential wells of FIG. 3, and their discrepancy in barycenter of sensitivity.

Assuming that, with the object image incident on the light receiving part 21 of the solid-state image sensor, electric charges $a_n$, $a_{n+1}$, $a_{n+2}$ and $a_{n+3}$ are accumulated, respectively, at the potential wells $W_n$, $W_{n+1}$, $W_{n+2}$ and $W_{n+3}$, the sensitivity distribution thus obtained becomes, for example, as shown in FIG. 4. Referring to FIG. 4, the heights of the accumulated electric charges $a_n$ and $a_{n+1}$ differ from each other while those of the electric charges $a_{n+2}$ and $a_{n+3}$ also differ from each other, because: Since the transfer electrodes 27 are made of the tranparent poly-silicon film, the sensitivity decreases on the short wave-length side.

In reading the signal electric charge by interlacedly driving the above-stated solid-state image sensor 2, for the odd-number field, the potential distribution is raised, for example, up to a level 41' by adding to the transfer electrodes 27 a potential of a level (such as about −10 V) which is lower than an intermediate level (corresponding to the potential distribution 41 of FIG. 3). Then, the signal electric charge accumulated at the potential well $W_n$ of the transfer electrode is added to the signal electrode which is accumulated at the potential well $W_{n+1}$ of the virtual electrode part which is on the same side as the transferring direction. At the time of the even-number field, the potential distribution is lowered, for example, to a level 41" by adding to the transfer electrodes 27, a potential (+5 V for example) which is higher than the intermediate level. Then, the signal electric charge accumulated at the potential well $W_{n+2}$ of the transfer electrode part is added together with the signal electric charge accumulated at the potential well $W_{n+1}$ of the virtual electrode part on the side opposite to the transferring direction.

FIG. 4 further shows changes which take place in the location of the barycenter of sensitivity when the signal electric charges, accumulated at these wells, are added up as mentioned in the foregoing. Assuming that an arbitrary point on the axis of abscissa of FIG. 4 is x and the barcenter of sensitivity is c, the barycenter of sensitivity can be expressed by the following formula:

$$\int_c^\infty f(x) \cdot (x - c) dx = \int_c^{-\infty} f(x) \cdot (x - c) dx$$

Again referring to FIG. 4, "$a_n + a_{n+1}$" and "$a_{n+1} + a_{n+2}$" respectively indicate an electric charge obtained by adding up the electric charges accumulated at the potential wells $W_n$ and $W_{n+1}$ at the time of the odd-number field, and an electric charge obtained by adding up the electric charges accumulated at the potential wells $W_{n+1}$ and $W_{n+2}$ at the time of the even-number field. Reference symbols $x'_O$ and $x'_E$ respectively indicate the barycenters of sensitivity in the above-stated sensitivity distributions. However, compared with the barycenters of sensitivity $x_O$ and $x_E$, which are obtained when the sensitivity distributions are uniform, they are deviating by $\Delta x_O$ and $\Delta x_E$, respectively, due to interlacing. Besides, these deviation values $\Delta x_O$ and $\Delta x_E$ are not equal to each other. With the solid-state image sensor 2 interlacedly driven, a reproduced picture thus obtained comes to show some unevenness and the vertical resolution becomes lower.

Figure 7A:
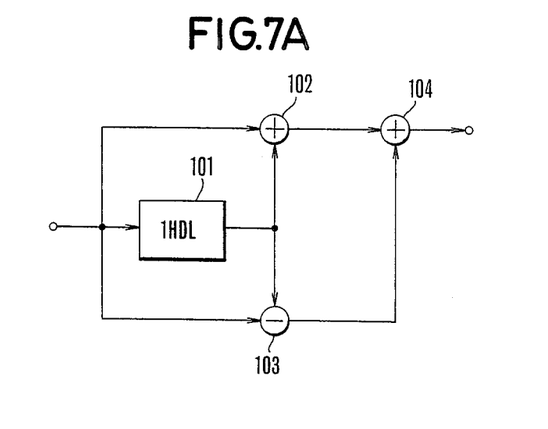
FIG. 7A is a block diagram showing, in outline, a video signal processing apparatus arranged according to this invention as a first embodiment thereof.
Figure 7B:
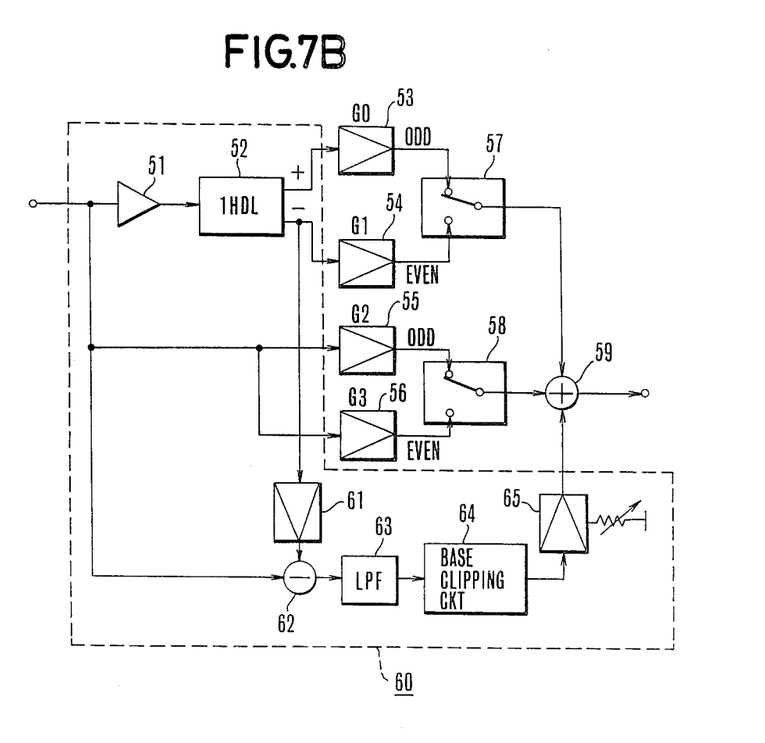
FIG. 7B is a block diagram showing the details of the first embodiment.

It is one of the main features of this invention to correct the deviation or discrepancy of the barycenter of sensitivity by interlacing correcting means which is employed in the embodiment shown in FIGS. 7A and 7B. This is accomplished by finding the sensitivity distribution of the potential wells and the characteristic of variations in the light image and by carrying out an interpolatory correcting method.

Figure 5:
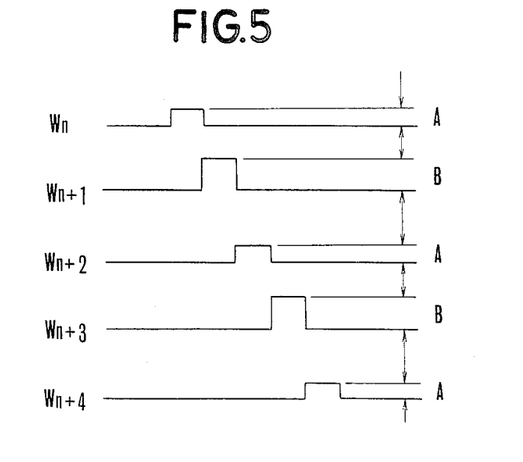
FIG. 5 is an illustration of the sensitivity distribution of the potential wells of FIG. 3.
Figure 6:
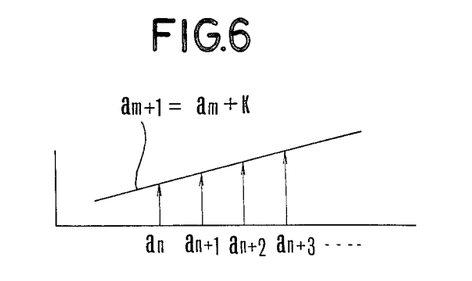
FIG. 6 is an illustration of an example of the local variations in signal electric charge which take place in a frame transfer CCD.

For the sake of simplicity, the sensitivity distribution of potential wells $W_n$ to $W_{n+4}$ is assumed to be as shown in FIG. 5. A reference symbol A denotes the transmittancy of the transfer electrode part and a symbol B that of the virtual electrode part. Assuming that the signal electric charge, which is obtained at each potential well when the light from the object comes to the potential wells $W_n$ to $W_{n+4}$, the addition output, which is obtained for the odd-number and even-number fields, and the sensitivity distribution are uniform, the necessary outputs corresponding to them become as shown in the following table:

| Potential well | Signal electric charge | Odd-number field | | Even-number field | |
|---|---|---|---|---|---|
| | | Addition output | Necessary output | Addition output | Necessary output |
| $W_n$ | $Aa_n$ | | | | |
| | | $Aa_n + Ba_{n+1}$ | $a_n + a_{n+1}$ | | |
| $W_{n+1}$ | $Ba_{n+1}$ | | | | |
| | | | | $Ba_{n+1} + Aa_{n+2}$ | $a_{n+1} + a_{n+2}$ |
| $W_{n+2}$ | $Aa_{n+2}$ | | | | |
| | | $Aa_{n+2} + Ba_{n+3}$ | $a_{n+2} + a_{n+3}$ | | |
| $W_{n+3}$ | $Ba_{n+3}$ | | | | |
| | | | | $Ba_{n+3} + Aa_{n+4}$ | $a_{n+3} + a_{n+4}$ |
| $W_{n+4}$ | $Aa_{n+4}$ | | | | |

Assuming that the local variations of the accumulated signal electric charge, due to the inconsistent characteristic of the picture elements of the solid-state image sensor, can be expressed by a linear function, there obtains the following formula:

$$a_{m+1} = a_m + K \quad (K: \text{a constant}) \tag{1}$$

In this instance, the value of the signal electric charge obtained at an arbitrary location is inferable by a linear interpolating method (extrapolation or interpolation). Therefore, the output of an accurate interlacing can be obtained by using the signals of two lines of the output of the solid-state image sensor which is employed as the image sensor.

Assuming that the ratio of combination of the two line signals is C to D, there obtains the following relation:

$$CS_{i-1} + DS_i = T_i \tag{2}$$

wherein $S_{i-1}$ represents a signal of a line preceding the present line by one line; $S_i$ a signal of the present line; and $T_i$ the necessary output. Formula (2) is applicable to every field. Therefore, by substituting the values of the addition output and the necessary output of the odd-number field shown in the table above, and also Formula (1) Formula (2) can be rearranged into the following formulas:

$$C(Aa_n+Ba_{n+1})+D(Aa_{n+2}+Ba_{n+3})=a_{n+2}+a_{n+3} \quad (3)$$

$$C\{Aa_n+B(a_n+K)\}+D\{A(a_n+2K)+B(a_n+3K)\}=a_n+2K+a_n+3K \quad (4)$$

With regard to $a_n$ and K, formula (4) above can be rearranged into:

$$(CA+CB+DA+DB-2)a_n+(CB+2DA+3DB-5)K=0 \quad (5)$$

Therefore, the functions of $a_n$ and K become zero. Then, there obtain the following relations:

$$C=(B-A)/2(A+B)^2 \quad (6)$$

$$D=(5A+3B)/2(A+B)^2 \quad (7)$$

With the signals $S_{i-1}$ and $S_i$ of two lines combined in the ratio of C to D, an output, in which the deviation or disorder of the barycenter of sensitivity in the odd-number field is corrected, is obtainable.

Next, as for the even-number field, the ratio of combination of two line signals, which are similar to those mentioned in the foregoing, assumed to be C' to D', there obtaines the following relation:

$$C'S_{i-1}+D'S_i=T_i' \quad (8)$$

Then, by substituting the value of the addition output and that of the necessary output of the even-number field shown in the table above and also Formula (1), the ratio C' to D' can be expressed as follows in the same manner as in the case of the odd-number field:

$$C'=-(B-A)/2(A+B)^2 \quad (9)$$

$$D'=(3A+5B)/2(A+B)^2 \quad (10)$$

With the signals of two lines $S_{i-1}$ and $S_i$ combined in the ratio of C' to D' which are obtained according to Formulas (9) and (10) above, the deviation of the barycenter of sensitivity in the even-number field can be corrected.

In accordance with the correction method described above, the correction is accomplished for both the odd-number and even-number fields. However, the correction also can be carried out to make the barycenter of sensitivity obtainable at even intervals by performing the correction only for one of the odd-number and even-number fields instead of performing it for both of them. For example, in that instance, correction may be performed only for the even-number field by shifting the position of the barycenter of sensitivity $x'_E$ of FIG. 4 to an extent of $\Delta x_O$ from the position $x_E$ or, in other words, to the right as viewed on the drawing. Further, assuming that there takes place such local variations in the signal electric charge that can be expressed by a quadratic function, the correction can be more accurately accomplished by carrying out interpolation according to a quadratic equation.

Outline of Video Signal Processing Apparatus arranged as First Embodiment of this Invention (FIG. 7A):

In accordance with this invention, an accurate video signal is obtained by correcting the deviation of barycenter of sensitivity resulting from interlaced driving on the basis of the above-stated principle. Another feature of this invention resides in that a signal for correcting the contour of the video signal is formed by utilizing the delay means which is provided for the interlaced driving operation. A first embodiment of the invention is arranged as shown in outline in FIG. 7A. Referring to FIG. 7A, a delay line 101 is arranged to delay, for one horizontal line period (hereinafter referred to as 1H period), an input video signal (for example, a luminance signal which is obtained from the low-pass filter 4 of FIG. 1). An addition circuit 102 is arranged to correlatively process a signal coming via the delay line 101 and a signal coming without passing through the delay line 101 in such a manner that the barycenter of sensitivity obtained by the interlaced driving operation is rearranged to be obtained substantially at even intervals. Further details of this arrangement will be described later with reference to FIG. 7B. A subtraction circuit 103 is arranged to form a contour correction signal by performing a subtracting operation on the signal coming via the delay line 101 and the signal not coming via the delay line. The details of the subtraction circuit 103 are as described later with reference to FIG. 7B. A processing circuit 104 is arranged to perform a contour correcting operation by means of the contour correction signal produced from the subtraction circuit 103 on an interlacing corrected signal produced from the addition circuit 102. In the case of FIG. 7A, the addition circuit 102 and the processing circuit 104 are arranged separately from each other. However, they may be arranged in one addition circuit without separating them.

FIG. 7B shows the details of the interlacing-and-contour correction circuit 5 which is shown in FIGS. 7A and 1. The illustration includes a buffer amplifier 51; a delay line 52, which is arranged to delay a signal by 1H period and corresponds to the delay line 101 of FIG. 7A, the output side of the delay line 52 being arranged to produce positive and negative outputs; amplifiers 53 and 54 which amplify the positive and negative outputs of the delay line 52 respectively, the gains or attenuations of the amplifiers 53 and 54 being assumed to be $G_0$ and $G_1$, respectively; amplifiers 55 and 56, which are arranged to directly amplify input signals, their gains or attenuations being assumed to be $G_2$ and $G_3$, respectively; and switches 57 and 58 which are respectively arranged to perform switch-over operations between the outputs of the amplifiers 53 and 54 and between those of the amplifiers 55 and 56 according to an odd-/even switch-over signal which is produced from the clock signal generating circuit 11 of FIG. 1. In this specific embodiment, an odd-number field is selected when the connecting position of each of these switches 57 and 58 is shifted to its upper contact and an even-number field when they are shifted to their respective lower contact. An adder 59 is arranged to add together for every field, the signals which are produced from the switches 57 and 58 and also adds to them a signal produced from a variable gain amplifier 65 which is included in a contour correction signal forming circuit. By this arrangement, a signal coming via the 1H delay line 52 and a signal not coming via the delay line 52 are combined with each other for every field, because: Since the absolute values of $\Delta x_O$ and $\Delta x_E$ shown in FIG. 4 differ from each other, the combination ratio values (C, D, etc.) expressed by Formulas (6), (7), (9) and (10)

must be changed for every field. The numerical examples of this is as follows:

Referring to Formulas (6), (7), (9) and (10), the values of A and B are assumed to be A=0.5 and B=1. Then, these ratio values become as follows:

C=0.11 and D=1.22 (odd-number field)
C'=−0.11 and D'=1.44 (even-number field)

Assuming that the gain of the buffer amplifier 51 is $H_O$ and the loss of the 1H delay line 52 is $H_1$, the arrangement is made to obtain the following relations:

$G_0 = C/(H_0 \times H_1)$ $G_1 = C'/(H_0 \times H_1)$ $G_2 = D$ $G_3 = D'$

Since the values of C and C' are small values, it permits use of an inexpensive delay line of small bandwidth as the 1H delay line 52. The signals thus obtained in the manner as described above is combined by an adder 59 into one signal. Since the output signal thus obtained has an improved vertical resolution characteristic with the deviation of the barycenter of sensitivity which is caused by the interlaced driving operation already corrected, the video signal processing apparatus, which is arranged as described above, is capable of producing an accurate video signal without specially increasing the number of picture elements of the solid-state image sensor and despite the inconsistent uneven characteristics of the picture elements and the positional deviation of a color separation filter if such a filter is used.

In FIG. 7B, contour correction signal forming means 60 is arranged in the following manner: The contour correction signal forming means includes an amplifier 61 which is arranged to amplify the negative output of the 1H delay line 52. The gain of the amplifier 61 is of a reciprocal number relative to the product of the gains or attenuations of the buffer amplifier 51 and the 1H delay line 52. The gain of the amplifier 61 is preferably arranged to be adjustable. Accordingly, the output of the amplifier 61 is adjusted to a level which is the same as that of the input signal of the amplifier. The two signals are combined into one signal by a subtracter 62. The details of this operation will be described later herein.

The output of the subtracter 62 is supplied via a low-pass filter 63, a base clipping circuit 64 and a variable gain amplifier 65 to an adder 59 as a contour signal. The adder 59 simultaneously performs interlacing correction and vertical contour correction. Assuming that the combining ratio of the output signal of the amplifier 61 which is delayed by the 1H delay line 52 to the signal not coming via any delay means is E to F, the ratio values can be expressed as follows:

$$ES_{i-1} + FS_i = T_i - T_{i-1} \tag{11}$$

wherein $S_{i-1}$ represents a signal preceding the present line by one horizontal line, $S_i$ a signal of the present line and $T_i - T_{i-1}$ a necessary output. Formula (11) is applicable to every field. Therefore, by substituting the addition output and the necessary output shown in the table given in the foregoing and also Formula (1), the above formula (11) can be arranged into the following formulas:

$$E(Aa_n + Ba_{n+1}) + F(Aa_{n+2} + Ba_{n+3}) = (a_{n+2} + a_{n+3}) - (a_n + a_{n+1}) \tag{12}$$

$$E\{Aa_n + B(a_n + K)\} + F\{A(a_n + 2K) + B(a_n + 3K)\} = (a_n + 2K + a_n + 3K) - (a_n + a_n + K) \tag{13}$$

Since Formula (13) is applicable always to $a_n$ and K, the functions $a_n$ and K become zero. Then, there obtain the following formulas:

$$E = \frac{-2}{A + B} \tag{14a}$$

$$F = \frac{2}{A + B} \tag{14b}$$

For the even-number field, the following relation likewise obtains:

$$E'S_{i-1} + F'S_i = T'_i - T'_{i-1} \tag{15}$$

With the addition output and the necessary output for the even-number field shown in the table and Formula (1) substituted in Formula (15), the values of E' and F' can be obtained according to the following formulas:

$$E' = \frac{-2}{A + B} \tag{16a}$$

$$F' = \frac{2}{A + B} \tag{16b}$$

According to these formulas (14a), (14b), (16a) and (16b), for both the odd-number and even-number fields, it is apparent that, in order to obtain a desired contour signal, the combination ratio between the signal coming via the delay means and the signal not coming via the delay means should be 1:1 with their signs opposite to each other. The amplifier 61 is arranged to adjust the gain of the output signal of the 1H delay line 52 in such a way as to meet the above-stated condition.

Further, the interlacing correction means of the video signal processing apparatus according to this invention may be changed as follows from the arrangement shown in FIG. 7B: In the case of the embodiment shown in FIGS. 7A and 7B, the correction is performed for both the odd-number and even-number fields. However, the intervals of the barycenter of sensitivity can be rearranged to have even intervals as a whole by making the correction only for one of the fields.

Assuming that the signal electric chages vary according to quadratic function, the correction can be accurately accomplished by performing interpolation according to a quadratic equation. In that event, two kinds of delay lines are arranged to carry out the correction by combining the original signal, a one-line delayed signal and a two-line delayed signal.

The correlative processing operation on the signal coming via the delay means and the signal not coming via the delay means is preferably performed with respect to the amplitudes of the two signals, and more preferably, if necessary, performed also with respect to their polarity.

In the case of the embodiment shown in FIGS. 7A and 7B, the original signal and the 1H period delayed signal are added together after these signals are switched according to the odd or even number of the filed of the picture. However, this switch-over may be arranged to be accomplished after these two correlatively processed signals are added together. The inserting position of the correction circuit 5 of FIG. 7A is not limited to the position on the output side of the sample-and-hold circuit 3 of FIG. 1. It may be arranged either within or on the output side of the luminance signal processing circuit 6 or, in case where correction is to be performed on the chrominance signals, may be arranged within the chrominance signal processing circuit.

This embodiment employs, as the image sensor, a frame transfer CCD having the virtual electrode part. In accordance with this invention, however, accurate interlacing also can be accomplished by using an image sensor of a different kind (such as a solid-state image sensor or a camera tube) with the characteristic of the picture elements or the positional arrangement of a color separation filter suitably selected.

The combination of the interlacing correction means and the contour signal forming means may be effected by arranging two sets of 1H delay lines to combine linear interpolating correction with quadratic differential type interpolating correction or to combine quadratic interpolating correction with quadratic differential type interpolating correction.

In case that the interlacing correction is to be performed for only one of the odd-number and even-number field portions of the video signal as mentioned in the foregoing, the contour correction is performed for both the odd-number and even-number fields by changing, for example, the circuit arrangement of FIG. 7B in the following manner: The amplitude and, if necessary, the polarity of the signal of one of the fields obtained via the delay line 52 and those of the signal of the same field not obtained via the delay line 52 are correlatively adjusted in such a way as to have the barycenter of sensitivity, which is disordered by the interlaced driving operation, rearranged to be obtained at even intervals as a whole.

In accordance with the arrangement of this embodiment described, the vertical resolution characteristic can be improved by the correction of the deviation of the barycenter of sensitivity caused by the interlacing driving operation on the image sensor. Therefore, despite the uneven characteristic among the picture elements of the image sensor and the positional deviation of a color separation filter, if such a filter is used, the interlacing driving operation can be accurately carried out. In addition to that, the delay means, which is necessary for the above-stated interlacing correction, is utilized also for forming a signal which is necessary for performing the contour correction on the video signal. This combined use of the delay means, such as a delay line which is expensive, contributes to reduction in cost of the whole apparatus.

Figure 8A:
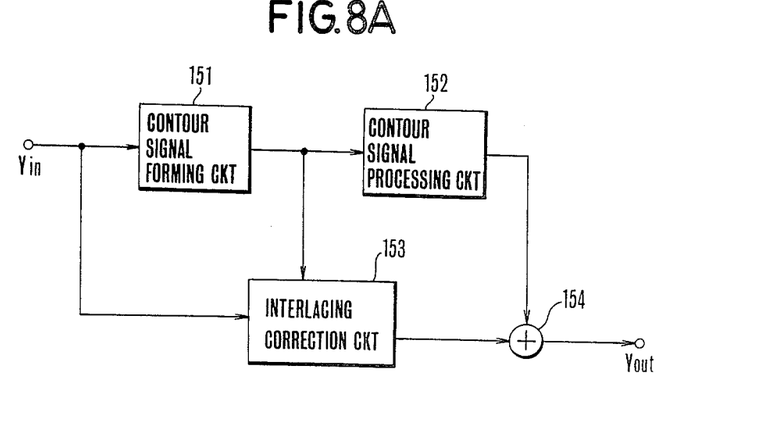
FIG. 8A is a block diagram showing, in outline, a video signal processing apparatus arranged as a second embodiment of this invention.

Outline of Video Signal Processing Apparatus arranged as Second Embodiment of the Invention (FIG. 8A):

FIG. 8A shows a second embodiment of this invention. The embodiment is arranged to obtain an accurate output signal by using a vertical contour signal on the above-stated principle in correcting the barycenter of sensitivity disordered by the interlaced driving operation and to have the delay means, which is arranged for forming the contour signal, used also for carrying out the interlacing result correcting operation. The vertical contour signal is arranged to emphasize a portion of the luminance signal having no vertical correlation (contour portion) and is normally formed according to correlation between two or three lines. For the sake of simplification, the following description takes up an example where the vertical contour signal is formed according to correlation between two lines:

In FIG. 8A, a reference numeral 151 denotes a contour signal forming circuit. Since the vertical contour signal $V_i$ can be expressed by a difference between the present signal $S_i$ and the signal preceding it by one line period, it is expressed as follows:

$$S_i - S_{i-1} = V_i \tag{17}$$

A numeral 152 denotes a contour signal processing circuit, which performs a necessary processing operation on the above-stated vertical contour signal $V_i$ in a known manner. A numeral 153 denotes an interlacing correction circuit which forms a necessary output $T_i$ as required by Formula (2) from the vertical contour signal $V_i$ and the present signal $S_i$. Assuming that the combination ratio values between these two signals are $E''$ and $F''$, the necessary output can be expressed as:

$$E''V_i + F''S_i = T_i \tag{18}$$

Using the formulas (1), (17) and (18) simultaneously, the combination ratio values $E''$ and $F''$ can be obtained. First, for the odd-number field indicated in the table shown in the foregoing, the following formulas can be obtained by substituting the addition output and the necessary output shown in the table and also substituting Formula (1) in Formula (18):

$$E''\{(Aa_{n+2} + Ba_{n+3}) - (Aa_n + Ba_{n+1})\} + \tag{19}$$

$$F''(Aa_{n+2} + Ba_{n+3}) = a_{n+2} + a_{n+3}$$

$$E''[\{A(a_n + 2K) + B(a_n + 3K)\} - \{Aa_n + B(a_n + K)\}] + \tag{20}$$

$$F''\{A(a_n + 2K) + B(a_n + 3K)\} = a_n + 2K + a_n + 3K$$

With regard to $a_n$ and K, Formula (20) can be rearranged as follows:

$$a_n(F''A + F''B - 2) + K2E''(A+B) + F''(2A+3B) - 5 = 0 \tag{21}$$

Since Formula (21) is applicable to $a_n$ and K in all cases, the functions $a_n$ and K become zero. Therefore, there obtain the following formulas:

$$E'' = \frac{A - B}{2(A + B)^2} \tag{22a}$$

$$F'' = \frac{2}{A + B} \tag{22b}$$

The values of $E''$ and $F''$ are in the following relation to the values of C and D obtained from Formulas (6) and (7):

$$E'' = C, \quad F'' = C + D \tag{23}$$

As for the even-number field, with the values of combination ratio between the vertical contour signal $V_i$ and the present signal $S_i$ assumed to be $E'''$ and $F'''$, there obtains the following relation:

$$E'''V_i + F'''S_i = T'_i \tag{24}$$

By substituting the addition output and the necessary output of the even-number field indicated in the table shown in the foregoing and Formula (1) in Formula (24)

above, the ratio values E''' and F''' can be obtained from the following formulas:

$$E''' = \frac{B-A}{2(A+B)^2} \quad (25a)$$

$$F''' = \frac{2}{A+B} \quad (25b)$$

The values E''' and F''' are in the following relation to the values of C' and D' obtained from Formulas (9) and (10):

$$E''' = -C', \quad F''' = C' + D' \quad (26)$$

Again referring to FIG. 8A, an adder 154 is arranged to add together the output of the contour signal processing circuit 152 and that of the interlacing correction circuit 153. An addition signal thus obtained is supplied, for example, to the luminance signal processing circuit 6 of FIG. 1. Then, the contour signal forming circuit 151 forms the vertical contour signal from the incoming luminance signal $Y_{in}$ when there is no vertical correlation. The output of the signal forming circuit 151 is processed by the contour signal processing circuit 152 and, in addition to this, the output of the circuit 151 is interporatively corrected along with the incoming luminance signal $Y_{in}$. These signals are added up at the adder 154 and, as a result, an output signal $Y_{out}$ is produced.

Figure 8B:
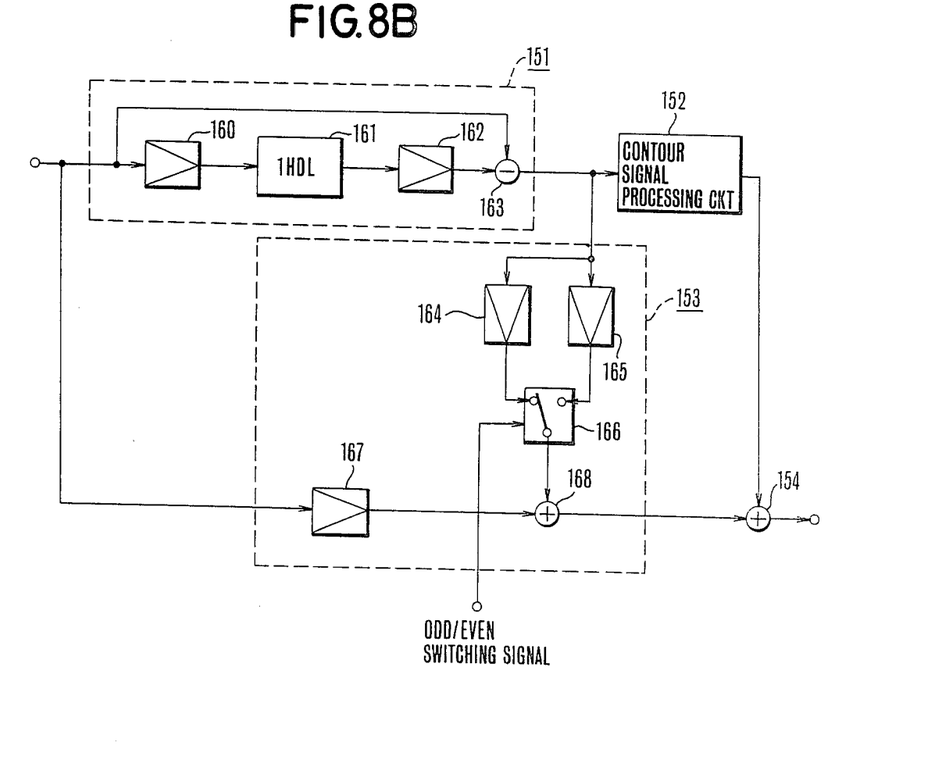
FIG. 8B is a block diagram showing the details of the second embodiment of this invention.

FIG. 8B shows, by way of example, the details of the interlacing-and-contour correction circuit 5 of FIG. 1 and FIG. 8A. In FIG. 8B, the same elements as those shown in FIG. 8A are indicated by the same reference numerals. The illustration includes amplifiers 160 and 162 and a 1H delay line 161. An incoming signal is amplified by the amplifier 160. The amplified signal is delayed for one horizontal line period by the 1H delay line 161. The delayed signal is amplified by the amplifier 162. The output of the amplifier 162 is then combined with the incoming signal at opposite polarities by a subtractor 163 into the vertical contour signal $V_i$.

Amplifiers 164 and 165 are arranged to amplify the vertical contour signal $V_i$. The gains or attenuations of these amplifiers 164 and 165 are assumed to be $G_1$ and $G_2$, respectively. A switch 166 is arranged to operate under the control of an odd/even switch-over signal produced from the clock signal generating circuit 11 of FIG. 1. The switch 166 is thus arranged to switch the outputs of the amplifiers 164 and 165, which are signals of the odd-number and even-number fields, from one over to the other and to supply them to an adder 168. Meanwhile, the incoming signal is amplified by an amplifier 167 which has a gain (or attenuation) $G_3$. The amplified incoming signal is supplied also to the adder 168. With these gains (or attenuations) $G_1$, $G_2$ and $G_3$ respectively correlated with the above-stated values E'', E''' and F'' (=F'''), interlacing correction can be accomplished as desired. It is also possible to have these values E'', F'', etc., not used as they are but arranged to be of the same ratio value.

In the case of the embodiment shown in FIGS. 8A and 8B, linear differential type contour correction and linear interpolatory correction are employed in combination. However, in accordance with this invention, other combinations are also possible. For example, a combination of quadratic differential type contour correction and linear interpolatory correction or a combination of quadratic differential type contour correction and quadratic interpolatory correction. In that instance, two sets of 1H delay lines may be arranged; and, during the process of forming the contour correction signal, a signal for interpolatory correction may be taken out. Further, the above-stated interlacing result correction means may be modified in a manner as described below:

In the embodiment shown in FIGS. 8A and 8B, the interlacing result correction is performed for both the odd-number and even-number fields. However, as mentioned in the foregoing, the intervals of the barycenters of sensitivity can be adjusted to be even intervals, as a whole, by performing the correction only for one of the odd-number and even-number fields instead of both of them. In such a modification of the embodiment shown in FIG. 8B, the vertical contour signal is amplified by the amplifier 164 or 165 only for one of the odd-number and even-number field portions thereof. Then, at the adder 168, the signal thus amplified is added together with the same field portion of the signal which is amplified by the amplifier 167. In this case, the above-stated gains (or attenuations) $G_1$ (or $G_2$) and $G_3$ become different from the values obtained by Formulas (22) and (25). However, the barycenters of sensitivity obtained by the interlaced driving operation can be processed to be at even intervals as a whole covering both the odd-number and even-number fields.

Assuming that the signal electric charge varies according to a quadratic function, the correcting operation can be accurately accomplished by performing interpolation according to a quadratic equation. In that instance, two kinds of delay lines are arranged and the correcting operation is carried out by combining the original signal, a one-line delayed signal and a two-line delayed signal.

In the case of FIG. 8B, the vertical contour signal is switched according to the odd-number field or the even-number field of the picture and, after that, the signal thus obtained is added together with the signal coming not through the contour signal forming means.

However, this arrangement may be changed to do the switching operation after the adding operation on the two signals.

In accordance with the second embodiment of this invention as mentioned in the foregoing, the vertical resolution characteristic can be improved as the disorder of the barycenters of sensitivity which results from the interlaced driving operation on the image sensor is corrected. Therefore, the interlacing driving operation can be accurately accomplished irrespective of the inconsistent characteristic among the picture elements of the image sensor and the positional deviation of a color separating filter, if such a filter is used. In addition to that advantage, the arrangement to use the output of the contour signal forming means for correction of the result of interlacing, effectively contributes to reduction in cost of the whole apparatus by virtue of the combined uses of the delay line which is expensive due to its complex structural arrangement.

What is claimed is:
1. A video signal processing apparatus comprising:
   (a) interlaced driving means for interlacedly driving an image sensor;
   (b) delaying means for delaying at least one of odd-number and even-number field portions of an output signal of said image sensor; and
   (c) processing means for correlatively processing the portion of said output signal delayed by said delay- ing means and the portion of said output signal not delayed by said delaying means in such a way as to correct a disorder of barycenters of sensitivity which results from the interlaced driving operation.

2. An apparatus according to claim 1, wherein said processing means includes adjusting means for correlatively adjusting an amplitude of said portion of said output signal delayed by said delaying means and an amplitude of said portion of said output signal not delayed by said delaying means.

3. An apparatus according to claim 2, wherein said processing means further includes adjusting means for correlatively adjusting the polarity of said two portions of said output signal.

4. A video signal processing apparatus comprising:
(a) means for interlacedly driving an image sensor;
(b) delaying means for delaying a portion of an output signal of said image sensor;
(c) processing means for correlatively processing, for at least one of odd-number and even-number field portions of said image sensor, said portion of said output signal delayed by said delaying means and a portion of said output signal not delayed by said delaying means in such a way as to correct a disorder of barycenters of sensitivity which results from the interlaced driving operation; and
(d) contour signal forming means for forming, with a delayed signal of said delaying means, a signal to be used for correcting a contour of the video signal of the apparatus.

5. An apparatus according to claim 4, wherein said processing means includes adjusting means for correlatively adjusting an amplitude of said portion of said output signal delayed by said delaying means and that of said portion of said output signal not delayed by said delaying means.

6. An apparatus according to claim 5, wherein said processing means further includes adjusting means for correlatively adjusting the polarity of said two portions of said output signal.

7. An apparatus according to any of claims 4, 5 or 6, wherein said contour signal forming means includes means for combining the delayed signal of said delaying means with said portion of said output signal not delayed by said delaying means.

8. A video signal processing apparatus comprising:
(a) means for interlacedly driving an image sensor;
(b) delaying means for delaying a portion of an output signal of said image sensor;
(c) contour signal forming means for forming a contour signal by using said delaying means; and
(d) processing means for correlatively processing, for at least one of the odd-number and even-number field portions of said output signal of the image sensor, said portion of said output signal delayed by said delaying means and a portion of said output signal not delayed by said delaying means in such a way as to correct a disorder of barycenters of sensitivity which results from said interlaced driving operation.

9. An apparatus according to claim 8, wherein said contour signal forming means includes means for combining a delayed signal of said delaying means with said portion of said output signal not delayed by said delaying means.

10. An image sensing device comprising:
(a) an image sensor arranged to convert an optical image into an electrical image signal;
(b) contour correction means for carrying out contour correction by selecting each portion of an output signal of said image sensor and performing a computing operation on said selected portion of the output signal of said image sensor together with another portion of said output signal adjacent to said selected portion; and
(c) means for correcting a barycenter of sensitivity of said output signal of said image sensor by using delay means which is included in said contour correcting means.

11. An image sensing device comprising:
(a) an image sensor arranged to convert an optical image into an electrical image signal;
(b) means for correcting a barycenter of sensitivity of an output signal of said image sensor by selecting each portion of the output signal of the image sensor and performing an operation on said selected portion of said output signal of said image sensor together with another portion of said output signal which is adjacent to said selected portion, said correcting means including delay means; and
(c) means for correcting a contour of the output signal of said image sensor by using said delay means which is included in said sensitivity barycenter correcting means.

12. An image sensing device comprising:
(a) an image sensor arranged to convert an optical image into an electrical image signal;
(b) delaying means for delaying a portion of an output signal of said image sensor; and
(c) operating means for performing an operation on the portion of said output signal of the image sensor delayed said delaying means together with another portion of said output signal not delayed by said delaying means, said operating means including a first operating means which is provided for correcting a barycenter of sensitivity of the output signal of said image sensor, and a second operating means which is provided for correcting a contour of the output signal of said image sensor.

* * * * *